United States Patent
Hara

(10) Patent No.: US 8,106,959 B2
(45) Date of Patent: Jan. 31, 2012

(54) IMAGE CAPTURING APPARATUS WITH APERTURE CORRECTION

(75) Inventor: Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 12/359,833

(22) Filed: Jan. 26, 2009

(65) Prior Publication Data

US 2009/0213238 A1 Aug. 27, 2009

(30) Foreign Application Priority Data

Feb. 26, 2008 (JP) .................. 2008-045102

(51) Int. Cl.
*H04N 5/228* (2006.01)
*H04N 5/208* (2006.01)

(52) U.S. Cl. ............... 348/222.1; 348/220.1; 348/252

(58) Field of Classification Search ............ 348/222.1, 348/E5.024, 220.1, 252
See application file for complete search history.

(56) References Cited

U.S. PATENT DOCUMENTS

| | | | | |
|---|---|---|---|---|
| 6,018,363 A * | 1/2000 | Horii | ........................ | 348/219.1 |
| 6,198,504 B1 * | 3/2001 | Nobuoka | ................. | 348/208.3 |
| 6,340,994 B1 * | 1/2002 | Margulis et al. | ............ | 348/625 |
| 6,819,359 B1 * | 11/2004 | Oda | ............................ | 348/247 |
| 7,136,097 B1 * | 11/2006 | Toyoda et al. | ............ | 348/222.1 |
| 7,730,406 B2 * | 6/2010 | Chen | ............................ | 715/723 |
| 2006/0077263 A1 | 4/2006 | Hosoda | | |
| 2006/0280244 A1 * | 12/2006 | Ishii et al. | ................ | 375/240.12 |
| 2007/0139536 A1 * | 6/2007 | Watanabe | ............... | 348/231.99 |
| 2007/0273750 A1 * | 11/2007 | Tanaka | ....................... | 348/14.01 |
| 2009/0128645 A1 * | 5/2009 | Chiba et al. | ............... | 348/220.1 |

FOREIGN PATENT DOCUMENTS

| | | |
|---|---|---|
| JP | 2006-101473 | 4/2006 |
| JP | 2007-019641 | 1/2007 |

* cited by examiner

*Primary Examiner* — Hung Lam
(74) *Attorney, Agent, or Firm* — Cowan, Liebowitz & Latman, P.C.

(57) ABSTRACT

The present invention provides an image capturing apparatus comprising an image capturing element configured to convert an optical image into an image signal, a signal processing unit configured to apply signal processing to the image signal and to output the processed image signal, a super-resolution processing unit configured to apply, when a still image of the object is to be captured during capturing of a moving image of the object, super-resolution processing for enhancing a resolution by compositing a plurality of image signals output from the signal processing unit, and outputting an image signal required to generate the still image of the object, and an APC correction unit configured to apply APC correction processing for emphasizing an edge of each of the image signal output from the signal processing unit and the image signal output from the super-resolution processing unit, and to output the processed image signal.

9 Claims, 9 Drawing Sheets

△ SAMPLING POSITION OF FIRST FRAME

□ SAMPLING POSITION OF SECOND FRAME

IMAGE CAPTURING APPARATUS WITH APERTURE CORRECTION

BACKGROUND OF THE INVENTION

1. Field of the Invention

The present invention relates to an image capturing apparatus which captures an image of an object.

2. Description of the Related Art

In recent years, as image capturing apparatuses such as digital cameras, an image capturing apparatus which has a function of capturing a moving image in addition to a function of capturing a still image, and an image capturing apparatus which has a function of recording sound simultaneously with capturing of a still image or moving image have been developed.

Such image capturing apparatus comprises an image capturing element including the number of pixels required to capture a still image having a resolution higher than that of a moving image. A moving image is captured at a high frame rate and using the number of pixels suited to the moving image as a result of execution of pixel additions, decimations, and the like on the image capturing element. In this way, the image capturing apparatus has a still image drive mode that outputs an image captured by the image capturing element intact (to be referred to as a "still image mode" hereinafter), and a moving image drive mode that executes pixel additions, decimations, and the like (to be referred to as a "moving image mode" hereinafter).

As a technique for capturing a still image during capturing of a moving image, Japanese Patent Laid-Open No. 2006-101473 has proposed a technique that captures an image while switching the drive mode of the image capturing element to the moving image mode or still image mode in accordance with an image to be captured (moving image or still image).

A technique that generates a high-resolution image by compositing a plurality of low-resolution images (to be referred to as "super-resolution" or "super-resolution processing" hereinafter) has been proposed. By applying such super-resolution processing, a still image can be captured during capturing of a moving image. For example, as a technique associated with super-resolution, Japanese Patent Laid-Open No. 2007-19641 has proposed an image signal processing method which executes signal processing after or during execution of the super-resolution processing.

However, when the drive mode of the image capturing element is switched to the still image mode upon capturing a still image during capturing of a moving image, image capturing at a frame rate required to capture a moving image can no longer be realized. Therefore, during capturing of a still image, an immediately preceding frame has to be maintained or a substitute frame such as a full black frame has to be used instead. As a result, a problem is posed, i.e., a moving image is frozen in practice.

Upon application of the super-resolution processing, a moving image can be avoided from being frozen. However, signal processing has to be applied to both low-resolution images for a moving image, and a high-resolution image that has undergone the super-resolution processing. Therefore, a signal processing unit which executes various kinds of processing including synchronization processing, APC correction processing, and the like needs to be configured to time-divisionally process low- and high-resolution images (i.e., to attain a high-speed operation), or such units need to be individually provided in correspondence with various kinds of processing, resulting in an increase in cost.

Furthermore, when super-resolution processing is applied to images for a moving image that have undergone signal processing, APC correction components applied for a moving image appear as unnatural bleeding as a result of the super-resolution processing. For example, upon execution of the APC correction processing, edge emphasized components are mixed. Therefore, when the super-resolution processing is applied to an image mixed with the edge emphasized components, the edge emphasized components spread, thus generating unnatural dark and bright parts in edge parts of a high-resolution image generated by the super-resolution processing.

SUMMARY OF THE INVENTION

The present invention provides an image capturing apparatus which can capture a still image with high image quality during capturing of a moving image, while suppressing an increase in cost.

According to the first aspect of the present invention, there is provided an image capturing apparatus for capturing an image of an object, comprising an image capturing element configured to convert an optical image formed via a lens into an image signal, a signal processing unit configured to apply signal processing to the image signal and to output the processed image signal, a super-resolution processing unit configured to apply, when a still image of the object is to be captured during capturing of a moving image of the object, super-resolution processing for enhancing a resolution by compositing a plurality of image signals output from the signal processing unit, and outputting an image signal required to generate the still image of the object, and an APC correction unit configured to apply APC correction processing for emphasizing an edge of each of the image signal output from the signal processing unit and the image signal output from the super-resolution processing unit, and to output the processed image signal.

Further features of the present invention will become apparent from the following description of exemplary embodiments with reference to the attached drawings.

DESCRIPTION OF THE EMBODIMENTS

Figure 1:
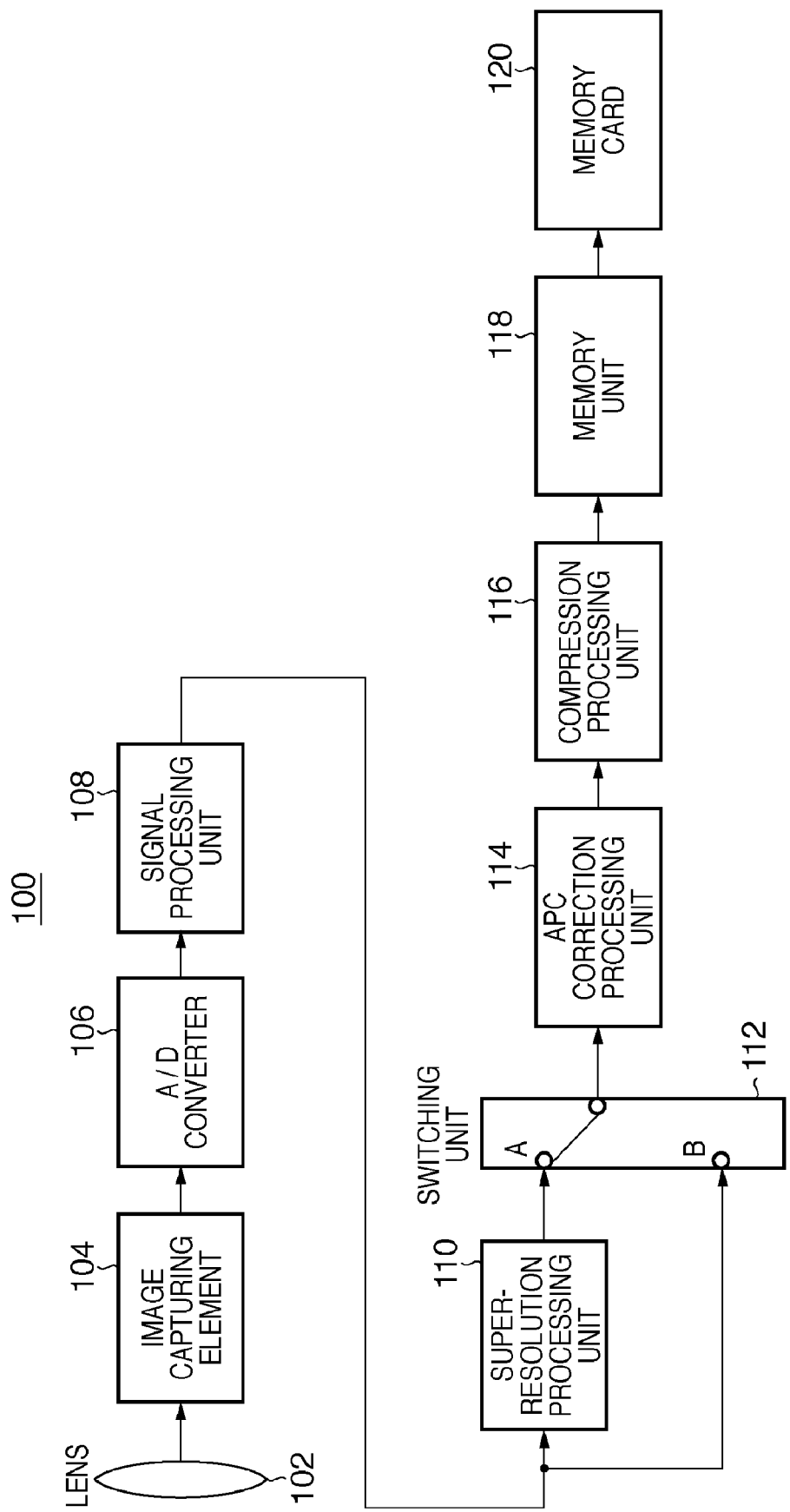
FIG. 1 is a schematic block diagram showing an image capturing apparatus as a first embodiment of the present invention.

Preferred embodiments of the present invention will be described hereinafter with reference to the accompanying drawings. Note that the same reference numerals denote the same members throughout the drawings, and a repetitive description thereof will be avoided.

Signal processing will be described below prior to a description of an image capturing apparatus of this embodiment.

An image capturing apparatus of a single-CCD type having color filters can only obtain information of a single color per pixel from an image capturing element. For example, in case of primary color filters, since color information of only one color of primary colors, i.e., red, green, and blue can only be obtained per pixel, an array is determined so that neighboring pixels have different color information. Processing for obtaining all three primary colors per pixel is called synchronization processing.

The signal processing includes image adjustment processing such as gamma correction processing, APC correction (Aperture Correction) processing, and KNEE correction processing, in addition to the synchronization processing. Especially, the APC correction processing applies edge emphasis, and has a role of restoring an edge blurred as a result of various kinds of processing such as the synchronization processing. Therefore, a signal processing unit that executes the signal processing is an important circuit in an image capturing apparatus which attaches an importance on image quality, and has a large circuit scale.

Figure 4:
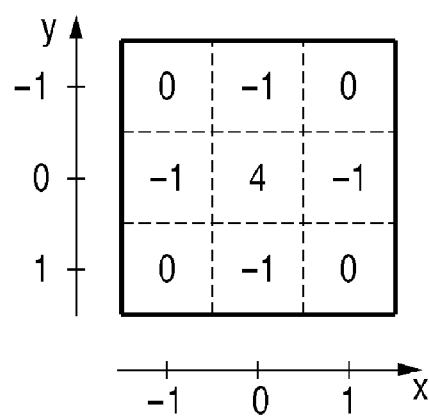
FIG. 4 is a view showing an example of APC coefficients required to determine the strength of APC correction in APC correction processing.
Figure 5A:
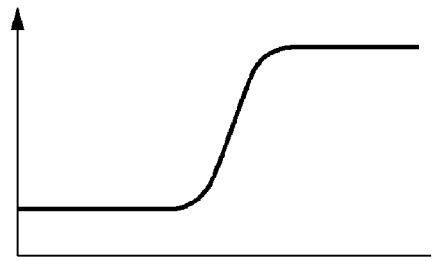
FIGS. 5A and 5B are views for explaining the APC correction processing.
Figure 5B:
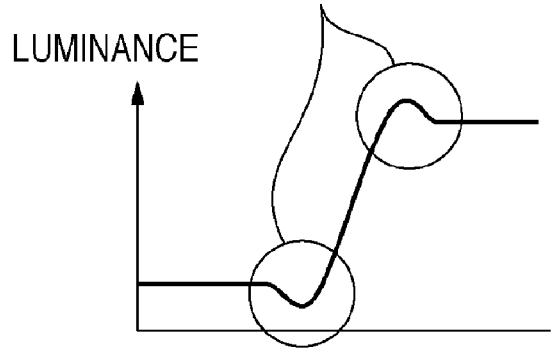

The APC correction processing is implemented by, for example, multiplying edge components extracted by a spatial filter by APC coefficients required to determine the degree (strength) of APC correction, as shown in FIG. 4, and adding the products. Depending on the APC coefficients, the shapes of edge emphasized components in an image (image signal) after the APC correction processing shown in FIG. 5B are determined with respect to an image (image signal) before the APC correction processing shown in FIG. 5A. When super-resolution processing is applied to an image including many edge emphasized components, those edge emphasized components tend to spread in a shift direction of alignment. FIG. 4 is a view showing an example of the APC coefficients required to determine the strength of APC correction in the APC correction processing. FIGS. 5A and 5B are views for explaining the APC correction processing: FIG. 5A shows an image before the APC correction processing, and FIG. 5B shows an image after the APC correction processing.

Figure 6A:
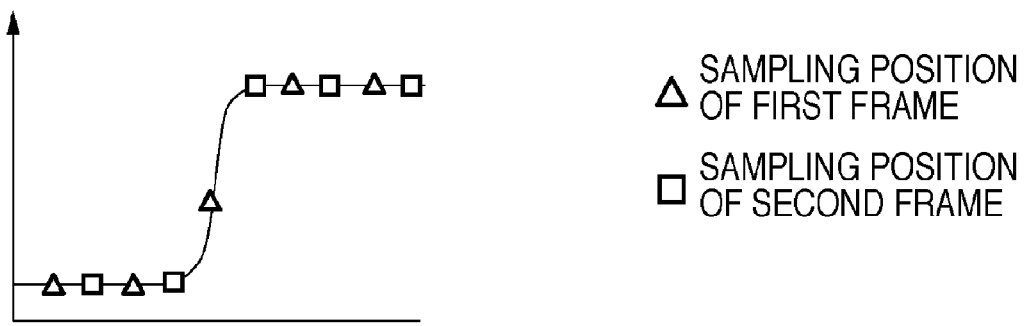
FIGS. 6A to 6E are views for explaining the APC correction processing.
Figure 6B:
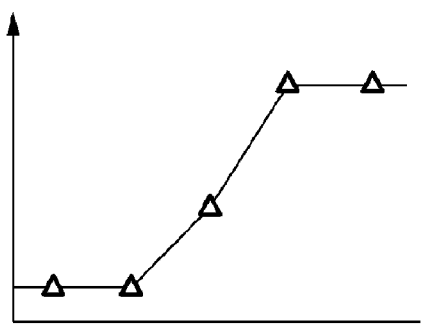
Figure 6D:
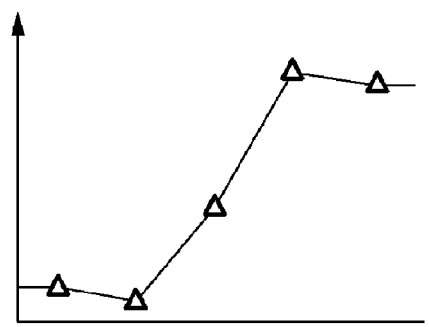
Figure 6C:
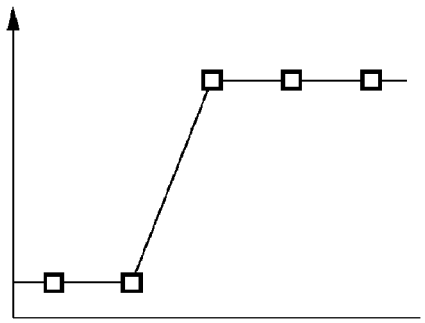

For example, a case will be explained below wherein an image of a simple edge is to be captured. Assume that an image is defined by one dimension limited to an X- or Y-axis in place of two dimensions. A case will be examined below wherein the captured edge is sampled, as shown in FIG. 6A. Assume that points indicated by triangles (Δ) in FIG. 6A are captured as a first frame image, and those indicated by squares (□) are captured as a second frame image. FIG. 6B shows the first frame image in this case, and FIG. 6C shows the second frame image. FIG. 6D shows an image obtained by applying the APC correction processing to the first frame image, and FIG. 6E shows an image obtained by applying the APC correction processing to the second frame image.

Figure 6E:
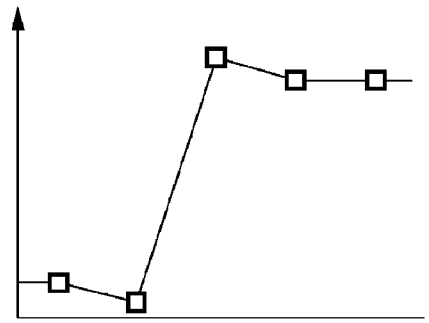
Figure 7:
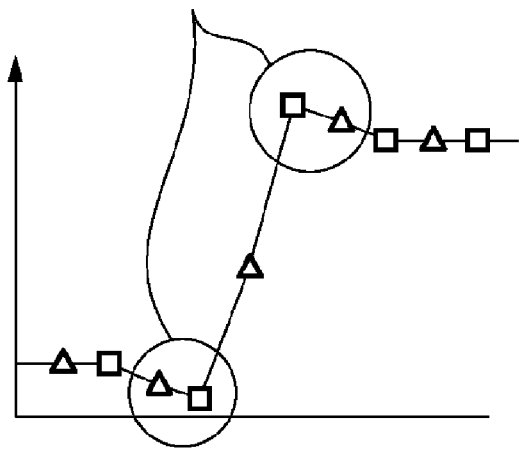
FIG. 7 is a view showing an image when super-resolution processing is applied to first and second frame images which are shown in FIGS. 6A to 6E, and have undergone the APC correction processing.

When the super-resolution processing is applied to the first and second frame images that have undergone the APC correction processing shown in FIGS. 6D and 6E, these images are composited in a state in which edge emphasized components are spread, as shown in FIG. 7. Hence, the aforementioned APC correction processing is applied to a degree that the edge emphasized components are inconspicuous even after images are composited by the super-resolution processing, and the APC correction processing is applied again after the super-resolution processing. As a result, the signal processing unit can be commonly used in capturing of a moving image and the super-resolution processing, thus suppressing an increase in circuit scale.

Figure 8:
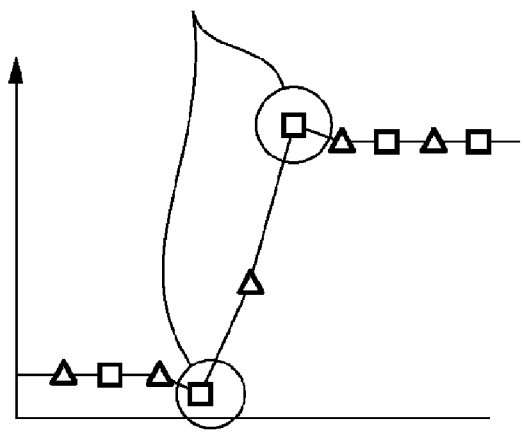
FIG. 8 is a view showing an example when the APC correction processing is applied to the first and second frame images shown in FIGS. 6A to 6E after the super-resolution processing is applied.

FIG. 8 shows an image obtained when the APC correction processing is applied after the super-resolution processing of the first and second frame images shown in FIGS. 6B and 6C. The bit depth per color component of an image before the signal processing is deeper than that after the signal processing. Therefore, upon applying the super-resolution processing to an image before the signal processing, a large-capacity memory is required as that for holding an image composited by that super-resolution processing. However, since applying processing for decreasing the bit depth before the signal processing results in a considerable image quality drop, it is preferable to apply the super-resolution processing to an image after the signal processing.

The super-resolution processing will be described in detail below. The super-resolution processing is processing for generating a high-resolution image from a plurality of low-resolution images having overlapping parts, as described above. In this embodiment, the super-resolution processing generates a still image from a plurality of frame images (moving image).

Figure 9:
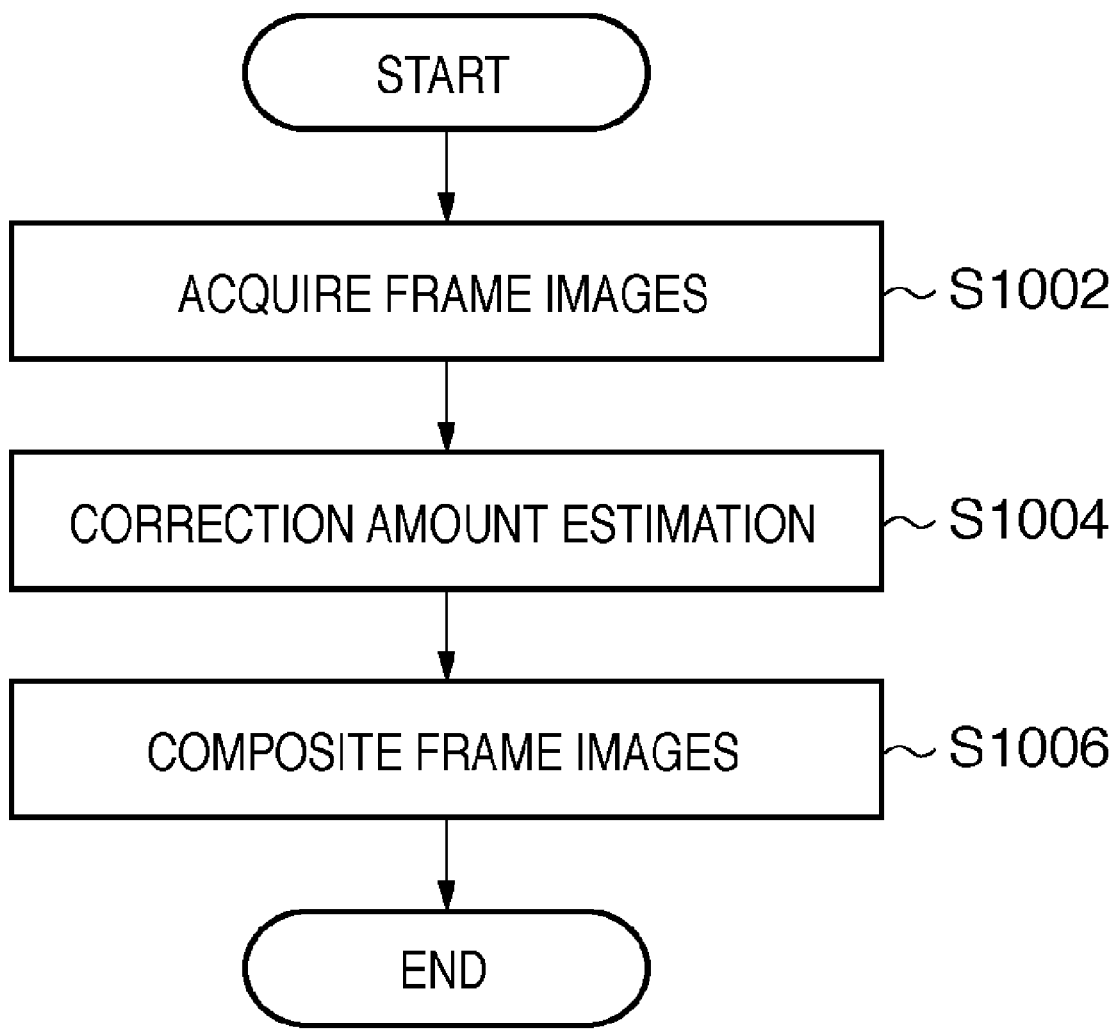
FIG. 9 is a flowchart for explaining the super-resolution processing.

FIG. 9 is a flowchart for explaining the super-resolution processing. In step S1002, a plurality of selected frame images are acquired. In this embodiment, four frame images are acquired. The plurality of selected frame images acquired in step S1002 are temporarily stored in a memory.

Note that each frame image includes tone data (pixel data) indicating tone values (pixel values) of pixels in a dot matrix shape. Each pixel data is YCbCr data including Y (luminance), Cb (blue color difference), and Cr (red color difference) components, RGB data including R (red), G (green), and B (blue) components, or the like, and depends on the type of image capturing element.

Figure 10:
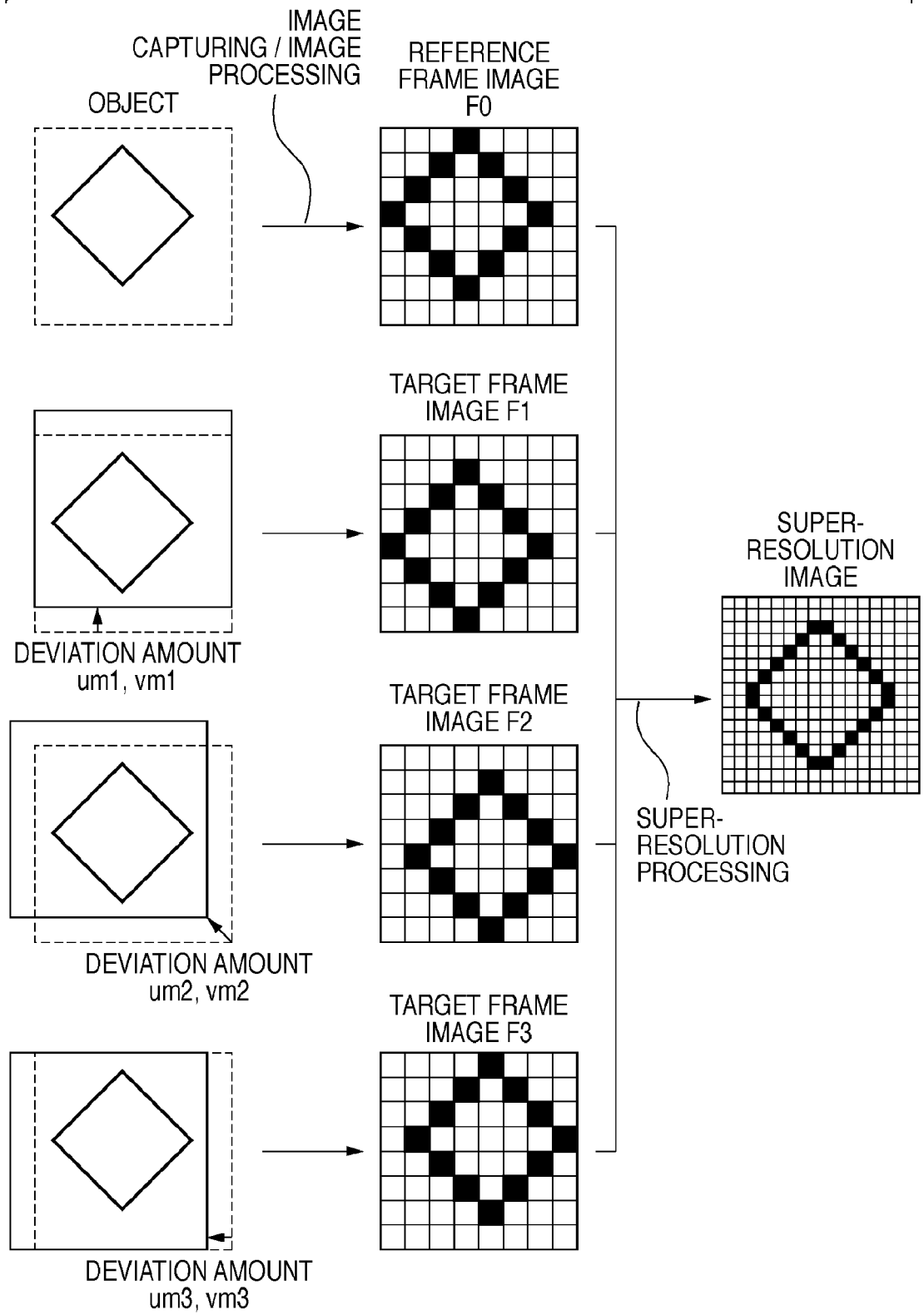
FIG. 10 is a view showing frame images used in the super-resolution processing and an image after the super-resolution processing.
Figure 11:
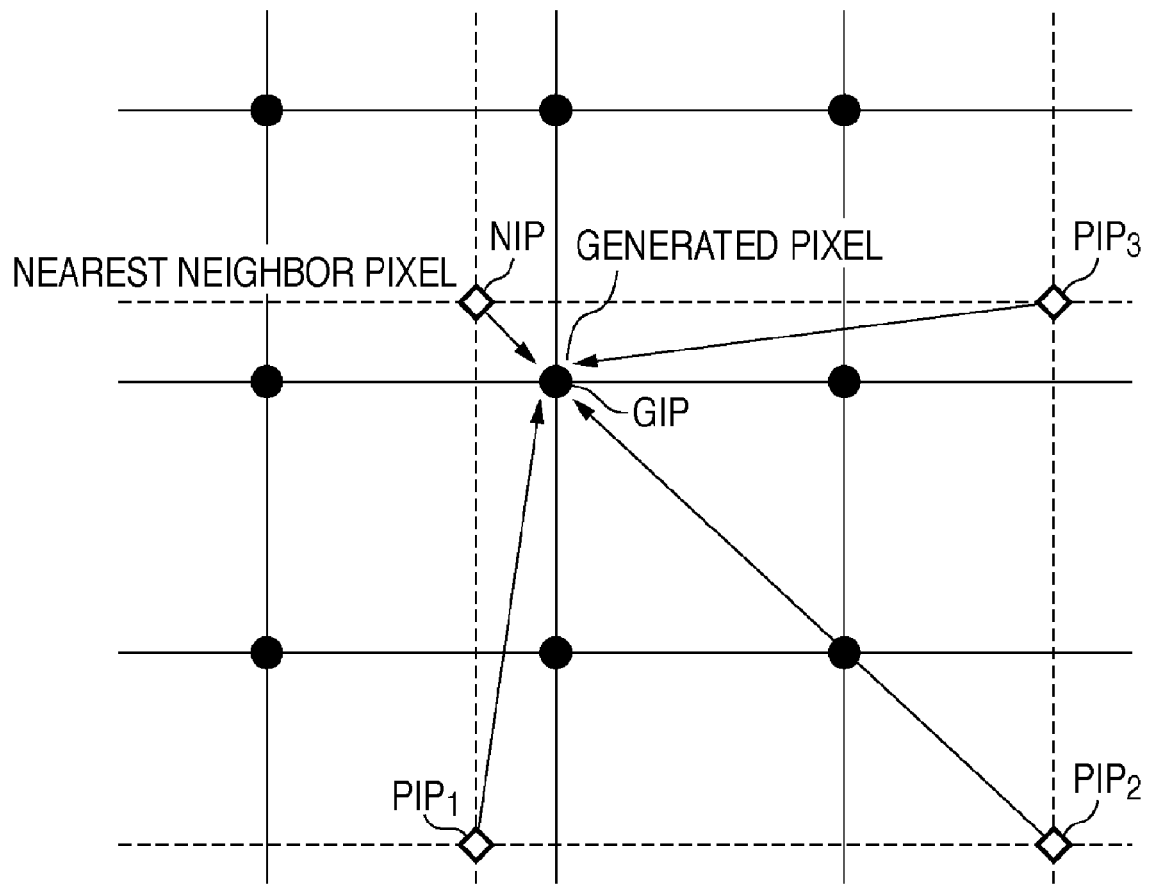
FIG. 11 is a view for explaining interpolation processing in the super-resolution processing.

In this embodiment, in order to clarify a description of the super-resolution processing, each frame image is indicated as multi-valued image data for only one color, as shown in FIGS. 10 and 11 (to be described later). Also, an image size is indicated as image data of 8×8=64 pixels in place of an actual moving image size (for example, a VGA size).

In step S1004, correction amounts used to correct deviations (positional deviations) of respective frames of three out of the four frame images acquired in step S1002 are estimated. In this correction amount estimation, one out of the four frame images is set as a reference frame, and the remaining three frame images are set as target frames. For respective target frames, correction amounts used to correct positional deviations with respect to the reference frame are estimated. In this embodiment, a frame image which is generated earliest of those acquired in step S1002 is set as a reference frame, and the remaining three frame images are set as target frames.

In the following description, the numbers (frame numbers) of the four frames acquired in step S1002 are expressed by n (n=0, 1, 2, 3), a frame of the frame number n is expressed as a frame n, and an image of the frame n is expressed as a frame image Fn. For example, a frame of the frame number n=0 is expressed as a frame 0, and an image of this frame 0 is expressed as a frame image F0. Note that the frame 0 is set as a reference frame, and the frames 1 to 3 are set as target frames. The frame image F0 of the reference frame is expressed as a reference frame image, and frame images F1 to F3 of the target frames are expressed as target frame images.

The positional deviation of an image can be expressed by a combination of a deviation of translation (horizontal or vertical direction) and a deviation of rotation. However, in this embodiment, a description and processing about a rotation deviation will not be given.

FIG. 10 is a view showing frame images used in the super-resolution processing and an image after the super-resolution processing. FIG. 10 shows an object, and a reference frame image F0 and target frame images F1 to F3, which are obtained by image capturing. A dotted rectangle that bounds the object indicates an angle of view upon capturing the reference frame image F0, and solid rectangles indicate those upon capturing the target frame images F1 to F3.

In FIG. 10, let "um" be a horizontal translation deviation amount, and "vm" be a vertical translation deviation amount. Also, let "umn" and "vmn" be these deviation amounts of each target frame image Fn (n=1, 2, 3). For example, as shown in FIG. 10, the target frame image F1 suffers a vertical translation deviation with respect to the reference frame image F0, and its deviation amount is expressed by um1 and vm1.

In order to composite the respective target frame images F1 to F3 with the reference frame image F0, the positional deviations of respective pixels of the respective target frame images have to be corrected so as to remove the deviations between the respective target frame images and the reference frame image. Let "u" be a horizontal translation correction amount used in such correction, and "v" be a vertical translation correction amount. Also, let "un" and "vn" be these correction amounts of each target frame image Fn (n=1, 2, 3). For example, the correction amounts for the target frame image F1 are expressed by u1 and v1.

Correction of the positional deviations of respective pixels of each target frame image means that the positions of respective pixels of the target frame image Fn (n=1, 2, 3) are moved by un in the horizontal direction and by vn in the vertical direction. Therefore, the correction amounts un and vn for each target frame image Fn (n=1, 2, 3) are expressed by relations un=−umn and vn=−vmn. For example, the correction amounts u1 and v1 for the target frame image F1 are expressed by u1=−um1 and v1=−vm1.

In this manner, by correcting the positions of respective pixels of the target frame image F1 using the correction amounts u1 and v1, the deviation between the target frame image F1 and the reference frame image F0 can be removed. Likewise, the target frame images F2 and F3 are also corrected using the correction amounts u2 and v2 and correction amounts u3 and v3.

Note that the correction amounts un and vn for the respective target frame images Fn (n=1, 2, 3) are calculated based on image data of the reference frame image F0 and those of the target frame images F1 to F3. This calculation uses, for example, a predetermined calculation method such as a pattern matching method, gradient method, or method of least squares. The calculated correction amounts un and vn are stored in a predetermined area of a memory as translation correction amount data.

In step S1006, a high-resolution still image is generated by compositing the reference frame image F0 and the target frame images F1 to F3 which have undergone positional deviation correction.

In this embodiment, as shown in FIG. 10, a unitary positional deviation of the target frame is expressed by one pixel. However, in actual image capturing, a position deviation of a one-pixel interval or less occurs, and the super-resolution processing can be implemented using such slight positional deviations.

Therefore, pixels (generated pixels) which define a still image to be generated include those which do not exit in any of the reference frame image and target frame images. As for these pixels, predetermined interpolation processing can be executed using pixel data (tone data indicating tone values) which express pixel values of pixels around each generated pixel. As the interpolation processing, various kinds of interpolation processing such as a bilinear method, bicubic method, and nearest neighbor method can be used.

A case will be described below with reference to FIG. 11 wherein the interpolation processing based on the bilinear method is used. From the reference frame image and target frame images, a frame image having a nearest neighbor pixel NIP at the closest distance position to that of a generated pixel GIP is selected. Of the selected frame image, three pixels which surround the position of the generated pixel GIP are determined as surrounding pixels $PIP_1$ to $PIP_3$, and values obtained by adding predetermined weights to data values of the surrounding pixels $PIP_1$ to $PIP_3$ are averaged to obtain the data value of the generated pixel GIP.

By repeating such processing for respective generated pixels, a super-resolution image having a doubled resolution can be obtained, as shown in, for example, FIG. 10. Note that the resolution is not limited to the doubled resolution, and various magnifications can be set. As the number of data values of a plurality of frame images to be used in the interpolation processing increases, a super-resolution image with higher resolution can be obtained.

First Embodiment

FIG. 1 is a schematic block diagram showing the arrangement of an image capturing apparatus 100 as a first embodiment of the present invention. The image capturing apparatus 100 can concurrently capture a moving image and still image of an object, and is embodied as a digital camera in this embodiment.

As shown in FIG. 1, the image capturing apparatus 100 includes a lens 102, image capturing element 104, A/D converter 106, signal processing unit 108, and super-resolution processing unit 110. Furthermore, the image capturing apparatus 100 includes a switching unit 112, APC correction processing unit 114, compression processing unit 116, memory unit 118, and memory card 120.

The lens 102 forms an optical image by projecting light coming from an object onto the image capturing element 104.

The image capturing element 104 converts an optical image formed via the lens 102 into an image signal (electrical signal) by photoelectric conversion.

The A/D converter 106 converts an analog image signal output from the image capturing element 104 into a digital image signal.

The signal processing unit 108 applies signal processing to an image signal output from the A/D converter 106. The signal processing unit 108 applies, as signal processing, for example, at least one of synchronization processing of color information included in an image signal, filter processing, separation processing for separating an image signal into a luminance signal and color-difference signals, gamma correction processing, and APC correction processing for emphasizing an edge of an image signal. Also, the signal processing unit 108 can apply, as signal processing, KNEE correction processing or the like.

The super-resolution processing unit 110 applies super-resolution processing for enhancing the resolution by compositing a plurality of image signals output from the signal processing unit 108. More specifically, when a still image of an object is to be captured during capturing of a moving image of that object, the super-resolution processing unit 110 receives a plurality of frame images for the moving image from the signal processing unit 108. The super-resolution processing unit 110 applies super-resolution processing to these plurality of frame images to generate a still image with a resolution higher than that of the moving image (an image signal required to generate such still image). Since the super-resolution processing is as has been described above (see FIGS. 9 to 11), a detailed description thereof will not be given.

The switching unit 112 has a function of switching an input to the APC correction processing unit 114 (i.e., a function of selecting an image signal output from the signal processing unit 108 or an image signal output from the super-resolution processing unit 110). In this embodiment, the switching unit 112 selects an A- or B-side path depending on whether the image capturing apparatus 100 captures a moving image or a still image. More specifically, upon capturing a moving image of an object, the switching unit 112 selects the B-side path, and inputs an image signal output from the signal processing unit 108 to the APC correction processing unit 114 without going through the super-resolution processing unit 110. On the other hand, upon capturing a still image of an object during capturing of a moving image of the object, the switching unit 112 selects the A-side path, and inputs an image signal output from the signal processing unit 108 to the APC correction processing unit 114 via the super-resolution processing unit 110.

The APC correction processing unit 114 applies APC correction processing for emphasizing an edge to an image signal output from the signal processing unit 108 or an image signal output from the super-resolution processing unit 110.

Note that the signal processing unit 108 and APC correction processing unit 114 apply the aforementioned APC correction processing in cooperation with each other.

The compression processing unit 116 applies compression processing to an image signal output from the APC correction processing unit 114.

The memory unit 118 stores an image signal which is output from the compression processing unit 116 and has undergone the compression processing.

The memory card 120 records an image signal stored in the memory unit 118.

The operation of the image capturing apparatus 100 will be described below. This embodiment will explain a case in which a still image of an object is to be captured during capturing of a moving image of the object. Therefore, assume that the switching unit 112 selects the B-side path, and the signal processing unit 108 outputs a plurality of image signals for a moving image.

Upon detection of an image capturing instruction of a still image of an object during capturing of a moving image of the object, the switching unit 112 selects the A-side path, and inputs a plurality of image signals output from the signal processing unit 108 to the super-resolution processing unit 110. Note that these plurality of image signals have undergone the signal processing including APC correction processing in the signal processing unit 108.

The plurality of image signals input to the super-resolution processing unit 110 undergo super-resolution processing, as described above, to generate an image signal required to generate a still image, and that image signal is output to the APC correction processing unit 114.

The image signal input to the APC correction processing unit 114 undergoes APC correction processing. The processed signal is stored in the memory unit 118, and is recorded in the memory card 120.

Note that in the image capturing apparatus 100, the APC correction processing applied to an image signal in the signal processing unit 108 is different from that to be applied to an image signal in the APC correction processing unit 114. More specifically, the signal processing unit 108 applies minimum required APC correction processing for the purpose of improvement of calculation precision of alignment calculations in the super-resolution processing unit 110. On the other hand, the APC correction processing unit 114 applies APC correction processing for the purpose of improvement of image quality. In other words, the degree of edge emphasis of the APC correction processing to be applied to an image signal by the signal processing unit 108 is weaker than that of the APC correction processing to be applied to an image signal by the APC correction processing unit 114. More specifically, the signal processing unit 108 applies APC correction processing to a degree that edge emphasized components are inconspicuous even after images are composited by the super-resolution processing, and the APC correction processing unit 114 applies the remaining APC correction processing again required for edge emphasis after the super-resolution processing.

In this way, since the image capturing apparatus 100 applies APC correction processing separately before and after the super-resolution processing, the signal processing unit 108 can be commonly used in capturing of a moving image and the super-resolution processing, thus suppressing an increase in circuit scale. Therefore, the image capturing apparatus 100 can capture a still image with high image quality during capturing of a moving image while suppressing an increase in cost.

In this embodiment, the APC correction processing unit 114, compression processing unit 116, memory unit 118, and memory card 120 are commonly used in capturing of a moving image and that of a still image by the super-resolution processing by using the switching unit 112. Such arrangement is particularly effective when a still image and moving image use an identical or similar compression codec (for example, JPEG and motion JPEG).

Second Embodiment

Figure 2:
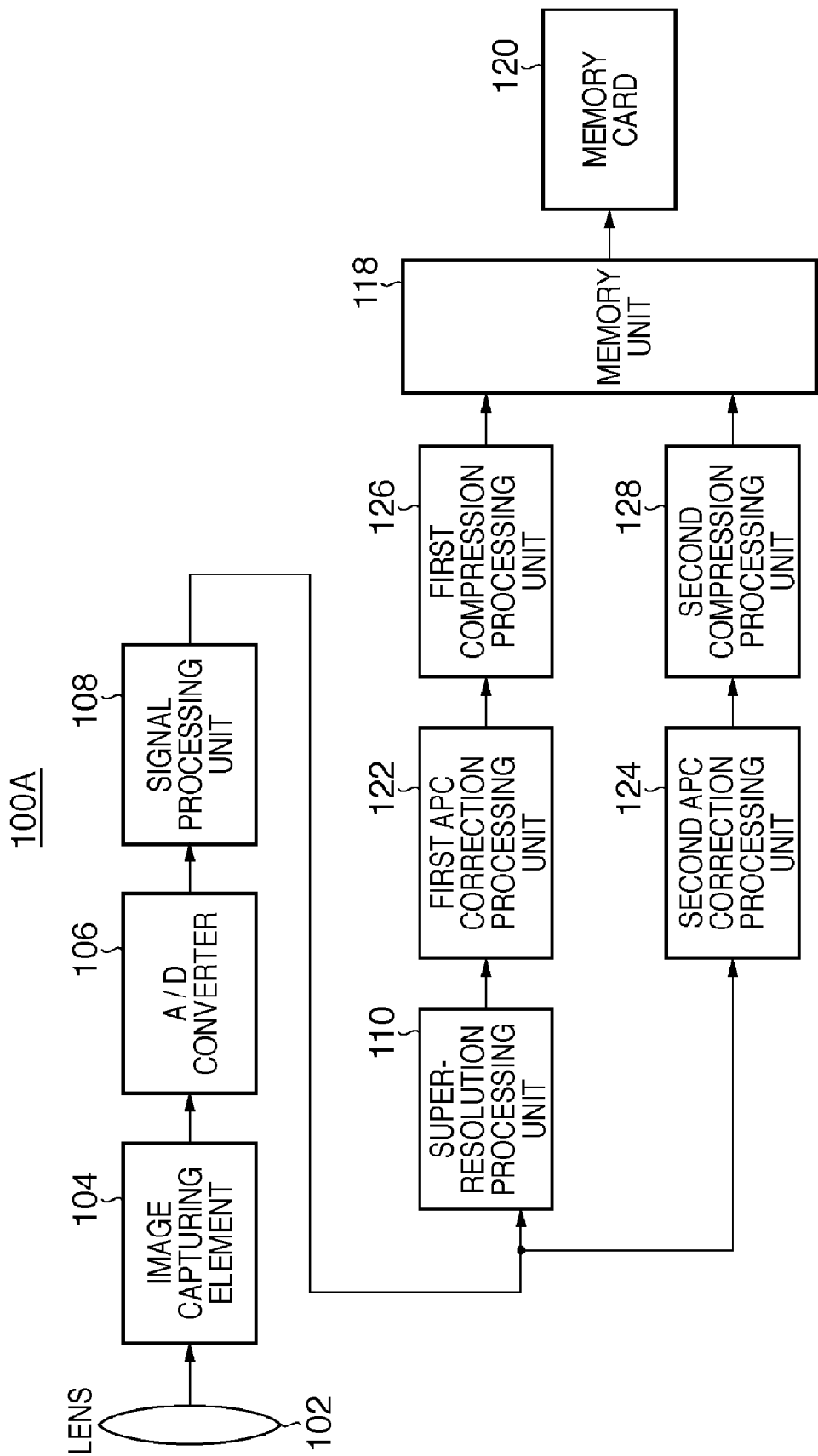
FIG. 2 is a schematic block diagram showing an image capturing apparatus as a second embodiment of the present invention.

FIG. 2 is a schematic block diagram showing the arrangement of an image capturing apparatus 100A as a second embodiment of the present invention. The image capturing apparatus 100A can concurrently capture a moving image and still image of an object, and is embodied as a digital camera in this embodiment.

The image capturing apparatus 100A includes an arrangement similar to that of the image capturing apparatus 100. More specifically, as shown in FIG. 2, the image capturing apparatus 100A includes a lens 102, image capturing element 104, A/D converter 106, signal processing unit 108, and super-resolution processing unit 110. Furthermore, the image capturing apparatus 100A includes a first APC correction processing unit 122, second APC correction processing unit 124, first compression processing unit 126, second compression processing unit 128, memory unit 118, and memory card 120.

The first APC correction processing unit 122 applies first APC correction processing for emphasizing an edge to an image signal output from the super-resolution processing unit 110. Upon capturing a still image during capturing of a moving image, the first APC correction processing unit 122 receives an image signal output from the signal processing unit 108 via the super-resolution processing unit 110.

The second APC correction processing unit 124 applies second APC correction processing for emphasizing an edge to an image signal output from the signal processing unit 108. Upon capturing a moving image, the second APC correction processing unit 124 receives an image signal output from the signal processing unit 108 without going through the super-resolution processing unit 110.

Note that the first APC correction processing and second APC correction processing are equal in terms of edge emphasis. However, these processes are different in that the first APC correction processing is that for an image signal required to generate a still image, while the second APC correction processing is that for image signals of a moving image.

The first compression processing unit 126 applies compression processing to an image signal output from the first APC correction processing unit 122. An image signal output from the first compression processing unit 126 is stored in the memory unit 118.

The second compression processing unit 128 applies compression processing to an image signal output from the second APC correction processing unit 124. An image signal output from the second compression processing unit 126 is stored in the memory unit 118.

In the image capturing apparatus 100A, the APC correction processing applied to an image signal by the signal processing unit 108 is different from that applied to an image signal by the first and second APC correction processing units 122 and 124. More specifically, the signal processing unit 108 applies minimum required APC correction processing for the purpose of improvement of calculation precision of alignment calculations in the super-resolution processing unit 110. On the other hand, the first APC correction processing unit 122 applies APC correction processing for the purpose of improvement of image quality of a still image. Also, the second APC correction processing unit 124 applies APC correction processing for the purpose of improvement of image quality of a moving image (frame images). In other words, the degree of edge emphasis of the APC correction processing to be applied to an image signal by the signal processing unit 108 is weaker than that of the APC correction processing to be applied to an image signal by the first and second APC correction processing units 122 and 124. More specifically, the signal processing unit 108 applies APC correction processing to a degree that edge emphasized components are inconspicuous even after images are composited by the super-resolution processing, and the first APC correction processing unit 122 applies the remaining APC correction processing again required for edge emphasis after the super-resolution processing. Likewise, the second APC correction processing unit 124 applies the remaining APC correction processing again required for edge emphasis even when no super-resolution processing is applied.

In this manner, since the image capturing apparatus 100A applies the APC correction processing separately before and after the super-resolution processing, the signal processing unit 108 can be commonly used in capturing of a moving image and the super-resolution processing, thus suppressing an increase in circuit scale. Therefore, the image capturing apparatus 100A can capture a still image with high image quality during capturing of a moving image, while suppressing an increase in cost.

Note that the image capturing apparatus 100A is different from the image capturing apparatus 100 in that the APC correction processing unit which can be configured by a relatively small-scale circuit is divided into the first APC correction processing unit 122 for a still image (super-resolution image) and the second APC correction processing unit 124 for a moving image. Such arrangement is effective when compression codecs of a still image and moving image are different (for example, JPEG and MPEG4). Also, the image capturing apparatus 100A can process both a still image and moving image faster than the image capturing apparatus 100 since one processing is not interrupted by the other processing. This is because the image capturing apparatus 100A includes the first APC correction processing unit 122 and first compression processing unit 126 for a still image, and the second APC correction processing unit 124 and second compression processing unit 128 for a moving image.

Third Embodiment

Figure 3:
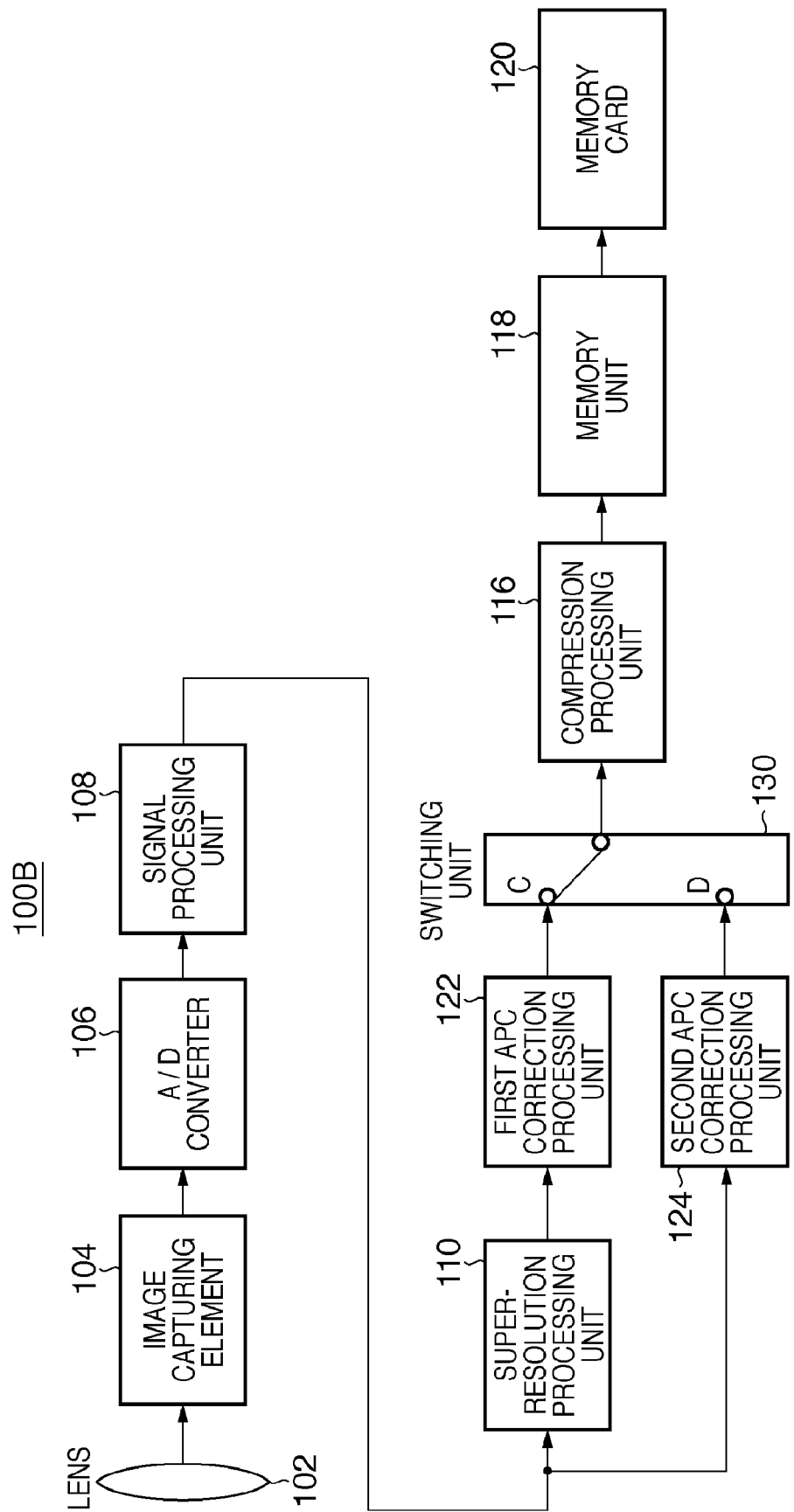
FIG. 3 is a schematic block diagram showing an image capturing apparatus as a third embodiment of the present invention.

FIG. 3 is a schematic block diagram showing the arrangement of an image capturing apparatus 100B as a third embodiment of the present invention. The image capturing apparatus 100B can concurrently capture a moving image and still image of an object, and is embodied as a digital camera in this embodiment.

The image capturing apparatus 100B includes an arrangement similar to those of the image capturing apparatuses 100 and 100A. More specifically, as shown in FIG. 3, the image capturing apparatus 100B includes a lens 102, image capturing element 104, A/D converter 106, signal processing unit 108, and super-resolution processing unit 110. Furthermore, the image capturing apparatus 100B includes a first APC correction processing unit 122, second APC correction processing unit 124, switching unit 130, compression processing unit 116, memory unit 118, and memory card 120.

The switching unit 130 has a function of switching an input to the compression processing unit 116 (i.e., a function of selecting an image signal output from the first APC correction processing unit 122 or that output from the second APC correction processing unit 124). In this embodiment, the switching unit 130 selects a C- or D-side path depending on whether the image capturing apparatus 100B captures a moving image or a still image. More specifically, upon capturing a moving image of an object, the switching unit 130 selects the D-side path, and inputs an image signal output from the second APC correction processing unit 124 to the compression processing unit 116. On the other hand, upon capturing a still image of an object during capturing of a moving image of the object, the switching unit 130 selects the C-side path, and inputs an image signal output from the first APC correction processing unit 122 to the compression processing unit 116. The compression processing unit 116 can apply different compression processing to an image signal in response to switching of an input by the switching unit 130.

In the image capturing apparatus 100B, the APC correction processing applied to an image signal by the signal processing unit 108 is different from that applied to an image signal by the first and second APC correction processing units 122 and 124. More specifically, the signal processing unit 108 applies minimum required APC correction processing for the purpose of improvement of calculation precision of alignment calculations in the super-resolution processing unit 110. On the other hand, the first APC correction processing unit 122 applies APC correction processing for the purpose of improvement of image quality of a still image. Also, the second APC correction processing unit 124 applies APC correction processing for the purpose of improvement of image quality of a moving image (frame images). In other words, the degree of edge emphasis of the APC correction processing to be applied to an image signal by the signal processing unit 108 is weaker than that of the APC correction processing to be applied to an image signal by the first and second APC correction processing units 122 and 124. More specifically, the signal processing unit 108 applies APC correction processing to a degree that edge emphasized components are inconspicuous even after images are composited by the super-resolution processing, and the first APC correction processing unit 122 applies the remaining APC correction processing again required for edge emphasis after the super-resolution processing. Likewise, the second APC correction processing unit 124 applies the remaining APC correction processing again required for edge emphasis even when no super-resolution processing is applied.

In this manner, since the image capturing apparatus 100B applies the APC correction separately before and after the super-resolution processing, the signal processing unit 108 can be commonly used in capturing of a moving image and the super-resolution processing, thus suppressing an increase in circuit scale. Therefore, the image capturing apparatus 100B can capture a still image with high image quality during capturing of a moving image, while suppressing an increase in cost.

The image capturing apparatus 100B is different from the image capturing apparatus 100 in that the first APC correction processing unit which applies APC correction processing to an image signal from the super-resolution processing unit 110, and the second APC correction processing unit which applies APC correction processing to an image signal from the signal processing unit 108 are independently arranged. As a result, even while the first APC correction processing unit 122 applies APC correction processing to an image signal from the super-resolution processing unit 110, the second APC correction processing unit 124 can apply APC correction processing to image signals output from the signal processing unit 108 at a high frame rate. Therefore, the image capturing apparatus 100B can process both a still image and moving image faster than the image capturing apparatus 100.

Also, the image capturing apparatus 100B is different from the image capturing apparatus 100A in that the common compression processing unit is used to apply compression processing to an image signal output from the first APC correction processing unit 122 and to apply compression processing to an image signal output from the second APC correction processing unit 124. Such arrangement is particularly effective when a still image and moving image use an identical or similar compression codec (for example, JPEG and motion JPEG).

In the present invention, the following modification is available. That is, a camera performs up to execution of an image capturing function, and a captured image is supplied to a personal computer (PC), which is connected to the camera via a communication unit and executes subsequent signal processing. In this case, the camera supplies drive mode switching information of an image capturing element to the PC. In the PC, its main CPU may implement the aforementioned super-resolution processing and APC processing by means of software processing in place of use of dedicated hardware. Software used in this case may be supplied from a recording medium such as a CD-ROM, or may be supplied by downloading it from a server connected via a network or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of the Japanese Patent Application No. 2008-045102 filed on Feb. 26, 2008, which is hereby incorporated by reference herein in its entirety.

What is claimed is:

1. An image capturing apparatus for capturing an image of an object, comprising:
    an image capturing element configured to convert an optical image formed via a lens into an image signal;
    a signal processing unit configured to apply signal processing to the image signal and to output the processed image signal;
    a super-resolution processing unit configured to generate an image signal having a higher resolution than that of the processed image signal output from said signal processing unit, by compositing a plurality of image signals output from said signal processing unit; and
    an emphasizing unit configured to emphasize an edge of the processed image signal, without going through said super-resolution processing unit, output from said signal processing unit and emphasize an edge of the image signal having the higher resolution output from said super-resolution processing unit.

2. The apparatus according to claim 1, further comprising a switching unit configured to switch an input to said emphasizing unit so as to input the processed image signal output from said signal processing unit to said emphasizing unit without going through said super-resolution processing unit when the moving image of the object is to be captured, and to input the processed image signal output from said signal processing unit to said emphasizing unit via said super-resolution processing unit when the still image of the object is to be captured,
    wherein said emphasizing unit applies first emphasizing processing for emphasizing an edge to the image signal having the higher resolution input to said emphasizing unit via said super-resolution processing unit, and applies second emphasizing processing different from the first emphasizing processing to the processed image signal input to said emphasizing unit without going through said super-resolution processing unit.

3. The apparatus according to claim 1, wherein said emphasizing unit comprises:
    a first emphasizing unit configured to apply first emphasizing processing for emphasizing an edge to the image signal having the higher resolution output from said super-resolution processing unit; and
    a second emphasizing unit configured to apply second emphasizing processing different from the first emphasizing processing to the processed image signal, without going through said super-resolution processing unit, output from said signal processing unit.

4. The apparatus according to claim 3, further comprising:
    a first compression processing unit configured to apply compression processing to the image signal output from said first emphasizing unit; and
    a second compression processing unit configured to apply compression processing to the image signal output from said second emphasizing unit.

5. The apparatus according to claim 3, further comprising:
a compression processing unit configured to apply compression processing to the image signal output from each of said first emphasizing unit and said second emphasizing unit; and
a switching unit configured to switch an input to said compression processing unit so as to input the image signal output from said second emphasizing unit to said compression processing unit when the moving image of the object is to be captured, and to input the image signal output from said first emphasizing unit to said compression processing unit when the still image of the object is to be captured.

6. The apparatus according to claim 1, wherein the signal processing includes at least one of synchronization processing of color information included in the image signal, filter processing, separation processing for separating the image signal into a luminance signal and color-difference signals, gamma correction processing, and emphasizing processing.

7. The apparatus according to claim 6, wherein a degree of edge emphasis of the emphasizing processing applied to the image signal by said signal processing unit is weaker than a degree of edge emphasis of the emphasizing processing applied to the image signal by said emphasizing unit.

8. The apparatus according to claim 3, wherein the signal processing includes at least one of synchronization processing of color information included in the image signal, filter processing, separation processing for separating the image signal into a luminance signal and color-difference signals, gamma correction processing, and emphasizing processing.

9. The apparatus according to claim 8, wherein a degree of edge emphasis of the emphasizing processing applied to the image signal by said signal processing unit is weaker than a degree of edge emphasis of each of the first emphasizing processing applied to the image signal by said first emphasizing unit and the second emphasizing processing applied to the image signal by said second emphasizing unit.

* * * * *